(12) United States Patent
Luo et al.

(10) Patent No.: US 11,693,586 B2
(45) Date of Patent: Jul. 4, 2023

(54) OVER PROVISIONING COMPONENT FOR MEMORY MANAGEMENT

(71) Applicant: Micron Technology, Inc., Boise, ID (US)

(72) Inventors: Xiangang Luo, Fremont, CA (US); Jianmin Huang, San Carlos, CA (US)

(73) Assignee: Micron Technology, Inc., Boise, ID (US)

( * ) Notice: Subject to any disclaimer, the term of this patent is extended or adjusted under 35 U.S.C. 154(b) by 58 days.

(21) Appl. No.: 17/357,496

(22) Filed: Jun. 24, 2021

(65) Prior Publication Data
US 2022/0413739 A1 Dec. 29, 2022

(51) Int. Cl.
*G06F 3/06* (2006.01)
*G06F 12/02* (2006.01)

(52) U.S. Cl.
CPC .......... *G06F 3/0655* (2013.01); *G06F 3/0604* (2013.01); *G06F 3/0679* (2013.01); *G06F 12/0246* (2013.01)

(58) Field of Classification Search
CPC ............................ G06F 3/0604; G06F 12/0246
See application file for complete search history.

(56) References Cited

U.S. PATENT DOCUMENTS

| 2014/0231954 | A1  | 8/2014  | Lue |
|---|---|---|---|
| 2015/0324119 | A1* | 11/2015 | Romanovsky .......... G06F 3/061 711/103 |
| 2016/0179386 | A1  | 6/2016  | Zhang |
| 2019/0042140 | A1* | 2/2019  | Natarajan ............... G06F 3/068 |
| 2021/0013903 | A1* | 1/2021  | Vanaparthy ........ H03M 13/1102 |

FOREIGN PATENT DOCUMENTS

WO    2017074570 A1    5/2017

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

*Primary Examiner* — David Yi
*Assistant Examiner* — Nicholas A. Paperno
(74) *Attorney, Agent, or Firm* — Brooks, Cameron & Huebsch, PLLC

(57) ABSTRACT

The present disclosure relates to designating or allocating static and dynamic SLC blocks between a non-write burst free block pool and a write burst free block pool. In some embodiments, a free block pool can be utilized by a host for write burst operations and/or non-write burst operations. In these embodiments, the over provisioning portion of the memory sub-system can be designated into a plurality of portions.

19 Claims, 6 Drawing Sheets

OVER PROVISIONING COMPONENT FOR MEMORY MANAGEMENT

TECHNICAL FIELD

Embodiments of the disclosure relate generally to memory sub-systems, and more specifically, relate to an over provisioning component for memory management.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
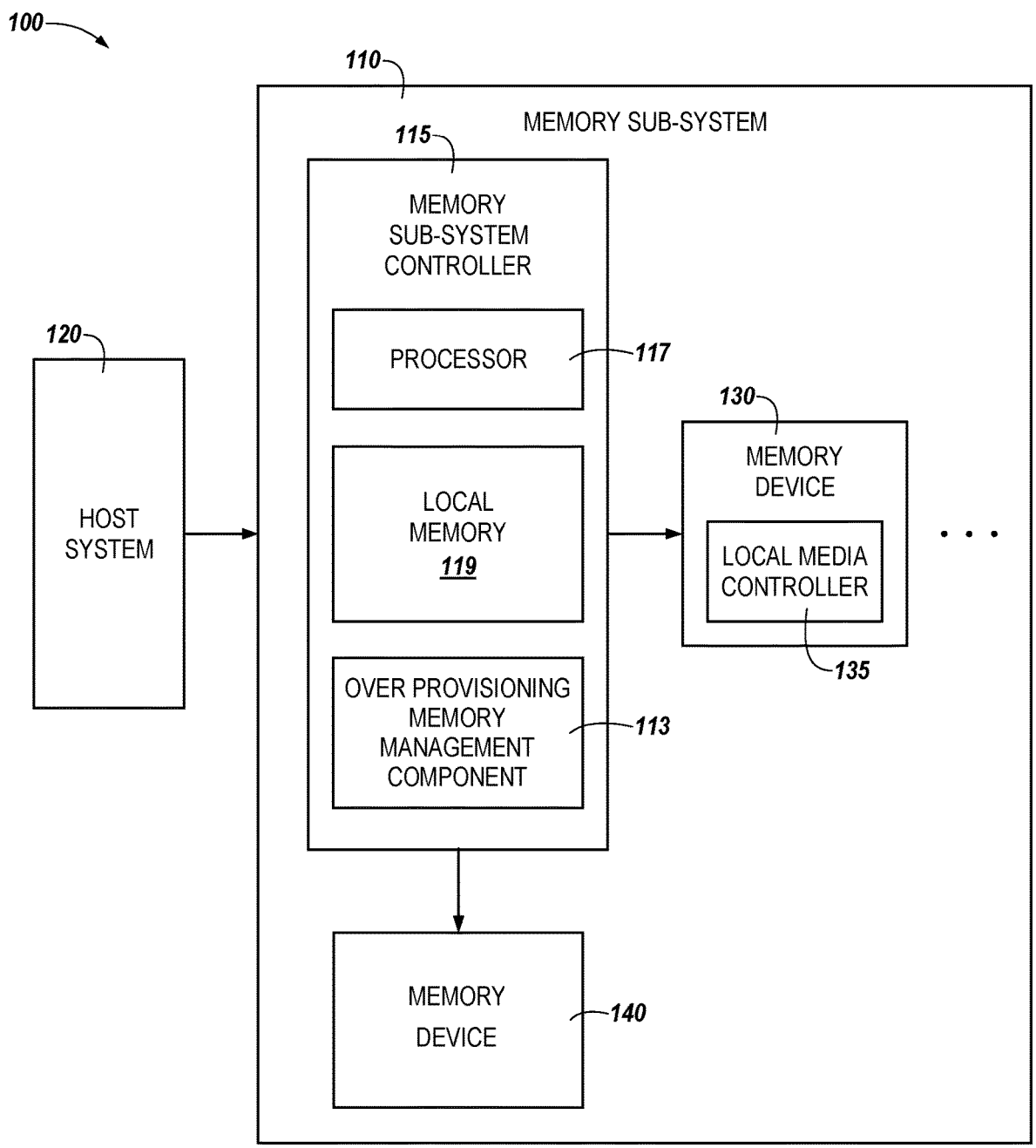
FIG. 1 illustrates an example computing system that includes a memory sub-system in accordance with some embodiments of the present disclosure.

Aspects of the present disclosure are directed to over provisioning memory management in a memory sub-system, in particular to memory sub-systems that include an over provisioning memory management component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1," or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

During operation, a memory sub-system can perform write burst operations, read burst operations, and/or other types of burst operations. In a similar way, the memory sub-system can perform non-write burst operations, non-read burst operations, and/or other types of non-burst operations. As used herein, a "write burst operation" generally refers to a write operation that is performed through a quantity of transactions that are less than a quantity of data written. In some embodiments, a write burst operation can be characterized by a greater quantity of write commands than an average number of write commands are executed in parallel. For example, a write burst operation may not utilize a separate transaction for each piece of data being written. In some examples, the write burst operation can include writing a cache line specifying only a start address of the cache line. During performance of a write burst operation, the memory sub-system can operate in a transient performance state (e.g., a burst mode of operation) that is shorter in duration with respect to a steady performance state (e.g., a normal mode of operation) and is characterized by performance that is greater than a steady performance state. In contrast a "non-write burst operation" can include writing performing a transaction for each data of a cache line. For example, a non-write burst operation can include utilizing a transaction for each cache line compared to a write burst operation that may utilize a single transaction for a plurality of cache lines. In some embodiments, non-write burst operations include operations that are performed when the memory sub-system is operating in a steady performance state.

In some embodiments, a host may request that write burst operations are to be performed on single level cell (SLC)

blocks until a write burst buffer is full. In these embodiments, the host may not request that non-write burst operations be performed on SLC blocks. In some examples, a qual level cell (QLC) can be forced to utilize SLC or TLC to support asynchronous power loss (APL). As used herein, "asynchronous power loss" can refer to a power loss that is not proceeded by a shutdown notification. For example, an asynchronous power loss can include a power loss that is unexpected and/or when a memory sub-system is not capable of performing final operations in response to a shutdown notification. In some embodiments, the memory sub-system can include a first portion designated for user data and a second portion that is designated for over provisioning.

As used herein, an "over provisioning portion" and variants thereof generally refers to a portion of a memory sub-system can include memory cells allocated by a memory sub-system controller (e.g., not by a host) for use during media management operations, such as garbage collection and/or wear leveling operations. By reserving a particular quantity of free memory blocks in an over provisioning portion of the memory sub-system, write operations can be performed involving the over provisioning portion without waiting for memory blocks that are not allocated to the over provisioning portion to be erased. This can allow for improved efficiency of the memory sub-system in comparison to approaches in which all of the memory blocks of a memory sub-system are accessible to the host. That is, the over provisioning portion can refer to a quantity of memory cells utilized for over provisioning operations. In some examples, the over provisioning portion can include memory cells designated as dynamic blocks and memory cells designated as static blocks. As used herein, "static memory cells" or "static blocks" generally refer to memory cells that are fixed in size once allocated to the size. As used herein, "dynamic memory cells" or "dynamic blocks" generally refer to memory cells that can be allocated to a plurality of different sizes and re-allocated to different sizes once allocated. In some embodiments, a static memory cell can have a relatively greater endurance than a dynamic memory cell. For example, a static SLC can have a relatively greater endurance than a dynamic SLC. In this example, the static SLC can have 10-50 times greater endurance compared to the dynamic SLC. However, in some embodiments, SLC blocks may not be used as QLC blocks and thus, using static SLC blocks can impact the over provisioning for the memory sub-system and limit functions of the blocks.

In some embodiments, a host or host device can utilize a universal flash storage (UFS) system to increase reliability of the memory sub-system. As used herein, a "universal flash storage system" generally refers to a storage specification protocol that can be utilized by the memory sub-system. In some examples, the UFS system can include instructions to perform write burst operations using SLCs of the memory sub-system. In some embodiments, the memory sub-system can allocate or designate a percentage (e.g., 0.25%, etc.) of the device capacity as write burst even at 100% logical saturation. As used herein, the term "logical saturation" generally refers to a quantity or percentage of memory resources that are being used or have data stored at a particular time. In this way, static SLC blocks and/or dynamic SLC blocks may be under utilized or be allocated in excess, which can lower overall system performance.

Aspects of the present disclosure address the above and other deficiencies by designating or allocating static and dynamic SLC blocks between a non-write burst free block pool and a write burst free block pool. As used herein, a "free block pool" can include memory cells that can be written to or do not currently have data written to them. In this way, a free block pool can be utilized by a host for write burst operations and/or non-write burst operations. In some embodiments, the over provisioning portion of the memory sub-system can be designated into a plurality of portions. For example, the over provisioning portion of the memory sub-system can include a write burst free portion, a non-write burst free portion, a write burst data portion, and/or a non-write burst data portion. By designating and re-designating memory cells between the different portions, the static and dynamic SLCs can be utilized more efficiently and increase an overall performance of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random-access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include an over provisioning memory management component 113. Although not shown in FIG. 1 so as to not obfuscate the drawings, the over provisioning memory management component 113 can include various circuitry to facilitate designating memory cells for write burst operations and non-write burst operations. In some embodiments, the over provisioning memory management component 113 can include special purpose circuitry in the form of an ASIC, FPGA, state machine, and/or other logic circuitry that can allow the over provisioning memory management component 113 to orchestrate and/or perform operations to selectively perform media management operations for the memory device 130 and/or the memory device 140.

In some embodiments, the memory sub-system controller 115 includes at least a portion of the over provisioning memory management component 113. For example, the memory sub-system controller 115 can include a processor 117 (processing device) configured to execute instructions stored in local memory 119 for performing the operations described herein. In some embodiments, the over provisioning memory management component 113 is part of the memory sub-system 110, an application, or an operating system.

In a non-limiting example, an apparatus (e.g., the computing system 100) can include an over provisioning memory management component 113. The over provisioning memory management component 113 can be resident on the memory sub-system 110. As used herein, the term "resident on" refers to something that is physically located on a particular component. For example, the over provisioning memory management component 113 being "resident on" the memory sub-system 110 refers to a condition in which the hardware circuitry that comprises the over provisioning memory management component 113 is physically located on the memory sub-system 110. The term "resident on" may be used interchangeably with other terms such as "deployed on" or "located on," herein.

In some embodiments, the over provisioning memory management component 113 can be configured to designate a portion of the memory array to store user data and designate a different portion of the memory array for over provisioning. In this way, the set of memory cells can be designated to perform over provisioning for the memory array. In some embodiments, the over provisioning memory management component 113 can cause one or more operations to be performed involving the set of memory cells that can allow for data to be erased from at least one portion of the memory array without interrupting a performance of the memory array and/or memory sub-system.

In some embodiments, the over provisioning memory management component 113 can be configured to designate a first portion of the set of memory cells as free write burst blocks. In these embodiments, the first portion can include dynamic single level cell (SLC) blocks and static SLC blocks. In some embodiments, the free write burst blocks can be open or unoccupied memory cells to be utilized by a host or host system for write burst operations. That is, circuitry resident on a memory sub-system can, in response to signaling received from the host, select memory cells from the first portion of the set of memory cells to use for write burst writing operations. In some examples, the first portion of the set of memory cells can include both dynamic SLC blocks and static SLC blocks. The quantity of free dynamic SLC blocks and static SLC blocks can change as data is written to blocks within the first portion of the set of memory cells and/or as data is erased from memory cells that are designated as data write burst blocks. In this way, the quantity of free dynamic SLC blocks and free static SLC blocks designated as the first portion of the set of memory cells can be monitored.

In some embodiments, the over provisioning memory management component 113 can be configured to designate a second portion of the set of memory cells as free non-write burst blocks. In these embodiments, the second portion can include dynamic SLC blocks. The free non-write burst blocks can be memory cells that are designated to be utilized by a host to perform non-write burst writing operations. That is, a memory sub-system can, in response to signaling received from a host, utilize the second portion of the set of memory cells to perform non-write burst writing operations.

In some embodiments, the designated second portion of the set of memory cells may not include any free static SLC blocks. As described herein, a particular protocol may not require that non-write burst blocks be written to static SLC blocks and thus, an original designation of the second portion of the set of memory cells for free non-write burst blocks may not include any free static SLC blocks. As used herein, an original designation of the second portion of the set of memory cells can generally refer to an initial designation or designation for a particular host protocol. Some previous approaches could use these types of original designations for the second portion of the set of memory cells since static SLC blocks were not required to be utilized for non-write burst operations.

In some embodiments, the over provisioning memory management component 113 can be configured to designate a static SLC block from the first portion to the second portion to be used as free non-write burst blocks. As described herein, the second portion may not include any static SLC blocks since a host may not use static SLC blocks for non-write burst operations, as described above. In some embodiments, the over provisioning memory management component 113 can designate the static SLC block to the second portion when a write request involving a non-write burst block from the second portion exceeds an available quantity of memory cells. Previous approaches may have to open a new block within the over provisioning portion, open a new block within the user area portion, and/or slow performance of the memory sub-system to accommodate the request. In contrast, the present disclosure designates the static SLC block from the first portion to the second portion to allow the request to be completed without opening an additional block or negatively affecting performance of the memory array.

In some embodiments, the over provisioning memory management component 113 can be configured to perform non-write burst operations using the designated static SLC block. Once the static SLC block is designated within the second portion, the over provisioning memory management component 113 can be configured to perform a non-write burst operation using the static SLC block. In this way, the data within the static SLC block can include non-write burst operation data. In addition, once the non-write burst operation data is written to the static SLC block, the static SLC block can be designated as a non-write burst data block or a data block that is occupied with non-write burst operation data.

In some embodiments, the over provisioning memory management component 113 can be configured to open a third portion of the memory array as free non-write burst blocks when a quantity of memory cells of the static SLC block is exceeded from the non-write burst write operations. In some examples, the designated static SLC block can be exceeded or occupied by the non-write burst write operations. If this occurs, the over provisioning memory management component 113 can open a third portion of the memory array and designate the third portion of the memory array as free non-write burst blocks. In some embodiments, additional static SLC blocks from the first portion can be designated to the second portion. In some embodiments, the over provisioning memory management component 113 can be configured to determine when there are no additional static SLC blocks from the first portion to designate to the second portion before opening the third portion of the memory array. In this way, opening the third portion, which can remove memory cells from the user data area and/or lower performance, can be avoided for a period of time. In some embodiments, the third portion may not need to be opened when the static SLC blocks from the first portion include a quantity to allows for all non-write burst request.

In some embodiments, the over provisioning memory management component 113 can be configured to designate the static SLC block back to the first portion from the second portion after a media management operation is performed on the memory array. In some embodiments, the media management operation can be a garbage collection operation that can erase the non-write burst operation data from the static SLC block. In this way, the static SLC block can be designated back to a free write burst block when it is designated back to the first portion. In these embodiments, the over provisioning memory management component 113 can be configured to designate a dynamic SLC block from the first portion to the second portion in response to designating the static SLC block back to the first portion.

In some embodiments, the over provisioning memory management component 113 can designate a dynamic SLC block from the first portion to the second portion to allow the second portion to include a particular quantity of memory cells that may have been required to store a particular non-write burst operation. That is, once the static SLC block is free or unoccupied by non-write burst operation data, the over provisioning memory management component 113 can determine the count or quantity of memory cells that were utilized by a particular non-write burst operation and designate dynamic SLC blocks from the first portion to the second portion based on the count or quantity of memory cells when the static SLC block is designated back to the first portion.

In some embodiments, the over provisioning memory management component 113 can be configured to designate free dynamic SLC blocks from a write burst data pool to the second portion in response to performance of a write burst flush operation. For example, the write burst data pool can include memory cells that are occupied with write burst operation data. In this example, a write burst flush operation can be performed to erase the write burst operation data from the dynamic SLC blocks designated to the write burst data pool. In this example, dynamic SLC blocks that were previously designated as free write burst blocks can be designated as free non-write burst blocks to increase the count of memory cells within the second portion.

In some embodiments, the over provisioning memory management component 113 can be configured to determine when the first portion includes no dynamic SLC block and prevent the static SLC block designated to the free non-write burst block from being designated a garbage collection source block. As described herein, some protocols can require that a static SLC block be utilized for write burst operations. Thus, in some embodiments, the static SLC block designated to the free non-write burst block can be prevented from being a designated garbage collection source block to allow the static SLC block to be designated back to the first portion or free write burst block.

Figure 2:
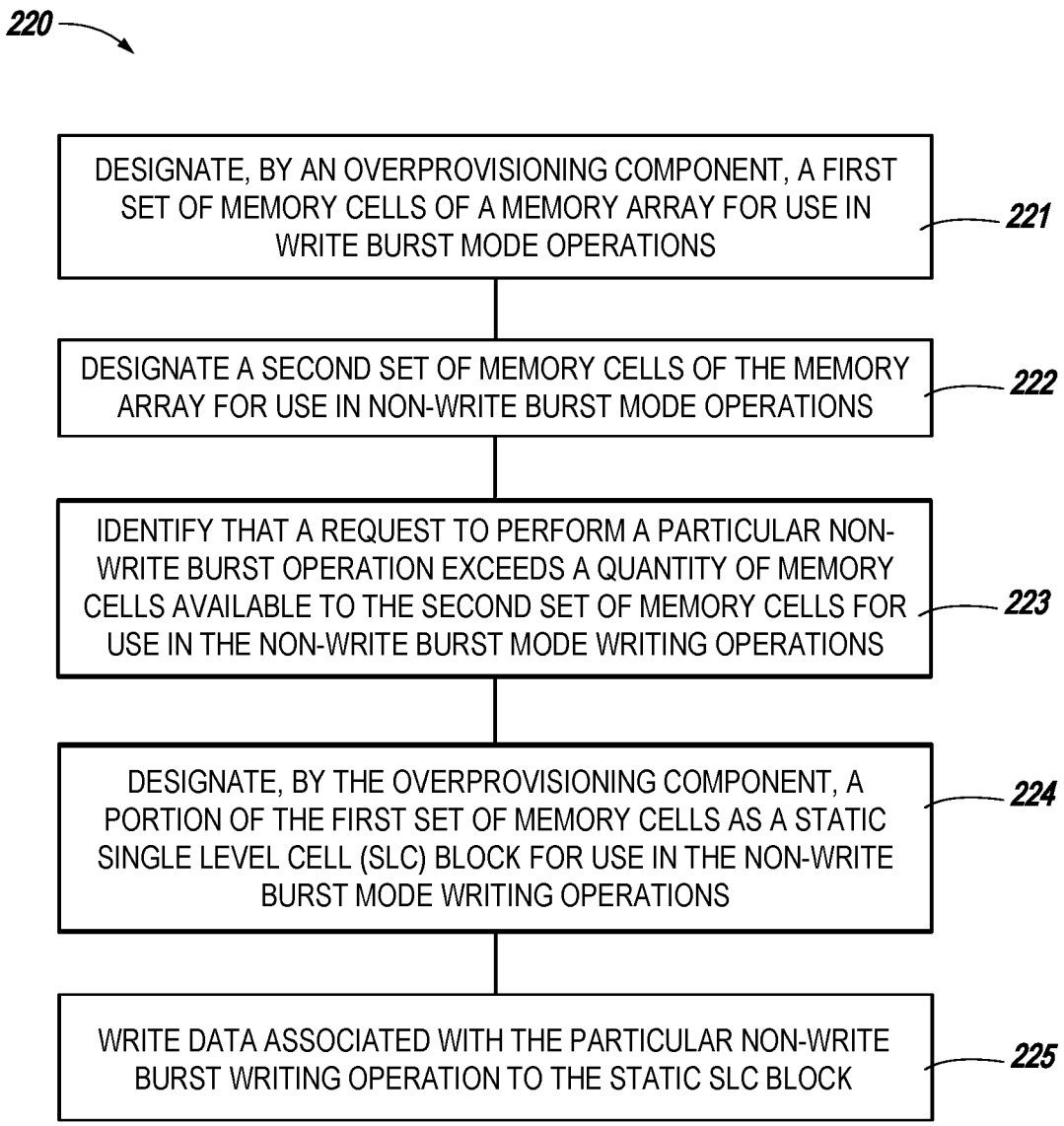
FIG. 2 is a flow diagram corresponding to a method for over provisioning memory management in accordance with some embodiments of the present disclosure.

FIG. 2 is a flow diagram corresponding to a method 220 for over provisioning memory management in accordance with some embodiments of the present disclosure. The method 220 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 220 is performed by the over provisioning memory management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As described herein, a memory array can include a designated user area portion that can be utilized to store data and a designated over provisioning portion that can be utilized to remove data through different memory management operations. In some examples, the over provisioning portion of a memory array can be split into a plurality of designated portions. For example, the over provisioning portion can include a first portion that includes free memory cells (e.g., free memory blocks) to be utilized for write burst operations, a second portion that includes free memory cells (e.g., free memory blocks) to be utilized for non-write burst operations, a third portion that includes occupied memory cells that include data from write burst operations, and/or a fourth portion that includes occupied memory cells that include data from non-write burst operations. The method 220 can be utilized to designate and redesignate (and/or allocate and re-allocate) different memory cells within the over provisioning portion of the memory array to increase efficiency of use for both static SLCs and dynamic SLCs within the over provisioning portion.

At operation 221, a first set of memory cells of a memory array can be designated for use in write burst mode operations. In some embodiments, the first set of memory cells include free memory cells for writing data associated with the write burst mode operations. In some embodiments, the memory array can include QLCs, MLCs, TLCs, and/or SLCs that are resident on a mobile device. For example, the memory array can include memory cells that are resident on a cell phone, smart phone, wearable device, or tablet. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to IoT device, among other types of edge computing devices. In some examples, the first set of memory cells can be designated to an over provisioning portion of the memory array. That is, the first set of memory cells can be designated for use in write burst mode operations within the over provisioning portion of the memory array. In this way, the first set of memory cells can be written in response to commands and/or signaling received by a memory sub-system from a host (e.g., host system 120, etc.) that are processed by the memory sub-system (e.g., the over provisioning component 113 and/or the memory sub-system controller 115) and asserted by circuitry resident on the memory sub-system in accordance with the write burst operations described herein.

At operation 222, a second set of memory cells of the memory array can be designated for use in non-write burst mode operations. In some examples, the second set of memory cells include free memory cells for writing data associated with the non-write burst mode operations. In some embodiments, the second set of memory cells can be designated to the over provisioning portion of a memory array. In some embodiments, the first set of memory cells and the second set of memory cells can both be designated to the over provisioning portion of the memory array. In this way, the first set of memory cells can be utilized by the memory sub-system (e.g., the over provisioning memory management component 113 and/or the memory sub-system controller 115) to perform write burst operations and the second set of memory cells can be utilized by the memory sub-system to perform non-write burst operations.

At operation 223, a request (e.g., one or more commands, one or more signals, etc.) to perform a particular non-write burst operation can be identified that exceeds a quantity of memory cells available to the second set of memory cells for use in the non-write burst mode writing operations. In some embodiments, the designated quantity of memory cells allocated to the second set of memory cells can be exceeded by memory accesses in response to write requests from the host system (e.g., host system 120) that are processed by the memory sub-system. Thus, the method 220 can include operations to identify when there is an indication that a particular request for a non-write burst operation exceeds the designated quantity of memory cells from the second set of memory cells. In some previous approaches, a new block of memory cells or a new quantity of memory cells can be opened and designated as non-write burst mode cells or designated as part of the second set of memory cells. In these previous approaches, additional memory cells can be designated away from the user data area of the memory array, which can lower resources available for a user of the computing system.

At operation 224, a portion of the first set of memory cells can be designated as a static single level cell (SLC) block for use in the non-write burst mode writing operations in response to the request. In some embodiments, instead of designating a portion of the user data area of the memory array, the method 220 can designate a portion of the first set of memory cells to the second set of memory cells. In these embodiments, the method 220 can include operations to designate the portion of the first set of memory cells as a static SLC block for use in the second set of memory cells. In this way, non-write burst operation commands and/or signaling processed by the memory sub-system from a host (e.g., host system 120, etc.) and asserted by circuitry resident on the memory sub-system are performed on the static SLC block that was originally designated for write burst operations within the first set of memory cells.

At operation 225, data associated with the particular non-write burst writing operation can be written to the static SLC block. As described herein, the method 220 can include operations to perform a non-write burst writing operation on the static SLC block that was originally designated to the first portion of memory cells. In this way, additional memory cells from the user data area or user allocation area of the memory array can remain at a particular quantity of memory cells (e.g., can include at least a threshold quantity of free or open memory blocks), which can provide better performance compared to utilizing additional memory cells from the user data area.

In some embodiments, the method 220 can include operations to perform a media management operation involving data written to the memory array. In some embodiments, the media management operation can include garbage collection. As used herein, "garbage collection" generally refers to a media management operation that attempts to remove data that is no longer in use or no longer usable. In some embodiments, the garbage collection can include a foreground garbage collection operation. As used herein, "foreground garbage collection" generally refers to a garbage collection operation on data that can be visible to a user or to a host. The method 220 can include operations to designate the static SLC block back to the first set of memory cells for the write burst mode operation when the data associated with the particular non-burst writing operation is erased during performance of the media management operation. In this way, the static SLC block can be redesignated back to the first set of memory cells for performance of subsequent write burst operations.

In some embodiments, the method 220 can include operations to designate a dynamic SLC block from the first set of memory cells to the second set of memory cells when the static SLC block is designated to the first set of memory cells. In some embodiments, the first set of memory cells may not include any free static SLC blocks that can be designated to the second set of memory cells. Thus, a dynamic SLC block can be designated from the first set of memory cells to the second set of memory cells. In these embodiments, the method 220 can include operations to record a count when no dynamic SLC blocks are available from the first set of memory cells. The count can be stored as an integer number (e.g., a binary number, floating-point number, or other integer number) within hardware associated with the over provisioning memory management component 113, the local memory 119, and/or any other component of the memory sub-system 110 as illustrated in FIG. 1. In some embodiments, the count can be stored in firmware that can be executable by the hardware components of the memory sub-system. Further, in these embodiments, the method 220 can include operations to prevent a write burst buffer size from being increased in response to recording the count.

In some embodiments, the method 220 can include operations to reduce the count when no dynamic SLC blocks are available from the first set of memory cells. In some embodiments, reducing the count can generally refer to reducing a quantity of data that is able to be stored within a particular set of memory cells. In these embodiments, the method 220 can include operations to release a dynamic SLC block from a write burst data block pool to the second set of memory cells and reduce the count in response to releasing the dynamic SLC block from the write burst data block pool. In some embodiments, the first set of memory cells can include a first set of free memory cells and the second set of memory cells can include a second set of free memory cells.

In these embodiments, a third set of memory cells that are designated to the write burst data block pool can be memory cells that have data written thereto (e.g., memory cells that are "occupied" with data). For example, the write burst data block pool can include a set of memory cells that include data that was written utilizing a write burst operation. In these embodiments, the dynamic SLC block from the write burst data block pool can be released (e.g., re-allocated as a different type of memory block and/or erased such that the block can be written to) following a media management operation, such as a garbage collection operation or similar operation that erases and/or folds the data stored in the dynamic SLC block. In this way, memory cells that previously stored data from a write burst operation can be allocated to a set of free cells to store non-write burst data from non-write burst operations. In these embodiments, memory cells can be designated to a fourth set of memory cells that include memory cells that are occupied with data that has been written utilizing a non-write burst writing operation. For example, the fourth set of memory cells can be referred to as a non-write burst data pool.

Figure 3:
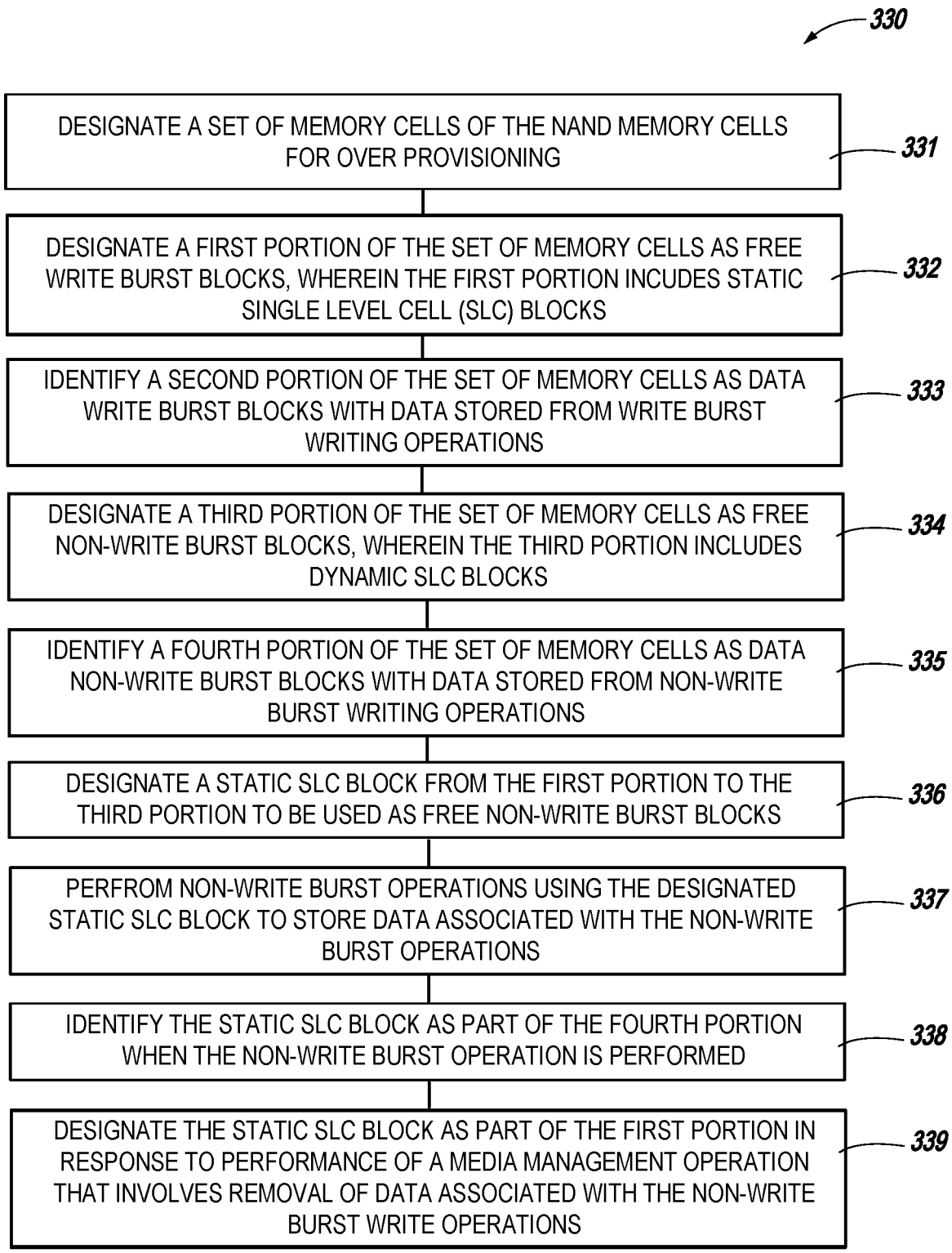
FIG. 3 is a flow diagram corresponding to a method for over provisioning memory management in accordance with some embodiments of the present disclosure.

FIG. 3 is a flow diagram corresponding to a method 330 for over provisioning memory management in accordance with some embodiments of the present disclosure. The method 330 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 330 is performed by the over provisioning memory management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As described herein, the over provisioning memory management component can be utilized to designate and redesignate different memory cells within the over provisioning portion of the memory array to increase efficiency of use for both static SLCs and dynamic SLCs within the over provisioning portion. At operation 331, a set of memory cells of the NAND memory cells can be designated for over provisioning. As described herein, the processor can designate a portion of the NAND memory cells for use in over provisioning.

At operation 332, a first portion of the set of memory cells can be designated as free write burst blocks. In some embodiments, the first portion includes static single level cell (SLC) blocks. As described herein, the free write burst blocks can include unoccupied or open memory cells that can be designated for write burst operations. The first portion can include the static SLC blocks since some protocols can require that write burst operations be performed on or using static SLC blocks. In some embodiments, the first portion can also include dynamic SLC blocks such that the first portion includes a combination of static SLC blocks and dynamic SLC blocks.

At operation 333, a second portion of the set of memory cells can be identified as data write burst blocks with data stored from write burst writing operations. In some embodiments, method 330 can include operations to designate a second portion of the set of memory cells as data write burst blocks. In some embodiments, the data write burst blocks or write burst data blocks can be memory cells that are occupied or have data stored from a write burst operation. That is, the data write burst blocks can be designated as data write burst blocks when data from a write burst operation is written to the data blocks. For example, a write burst operation can store write burst data to a particular free write burst block from the first portion and the particular free write burst block can be designated as a data write burst block.

At operation 334 a third portion of the set of memory cells can be designated as free non-write burst blocks. In some embodiments, the third portion can include dynamic SLC blocks. As described herein, some protocols may not require that non-write burst operations be performed using or performed on static SLC blocks. In these embodiments, the third portion of the set of memory cells may not include any static SLC blocks. Thus, the third portion of the set of memory cells may include only dynamic SLC blocks. In some embodiments, the free non-write burst blocks can include memory cells that are unoccupied or free from data. Since the third portion of the set of memory cells are designated as free non-write burst blocks, the third portion of the set of memory cells can be utilized by a host to perform non-write burst operations on the third portion of the set of memory cells.

At operation 335, a fourth portion of the set of memory cells can be identified as data non-write burst blocks with data stored from non-write burst writing operations. In these embodiments, the data non-write burst blocks can be occupied memory cells that have been utilized to store data from a non-write burst operation. Thus, when a free non-write burst block from the third portion is utilized to write data using a non-write burst operation, the free non-write burst block can be designated as part of the fourth portion of the set of memory cells.

At operation 336, a static SLC block from the first portion can be designated to the third portion to be used as free non-write burst blocks. In some embodiments, the static SLC block from the first portion is a free static SLC block. In this way, the static SLC block from the first portion may not include data or be occupied by data when it is designated to the third portion. In some example, designating the static SLC block from the first portion to the third portion can include providing a host with instructions that the static SLC block is to be utilized for storing data associated with non-write burst operations. In this way, the host can access the static SLC block in a similar way as one of the dynamic SLC blocks within the third portion to perform non-write burst operations on the static SLC block.

At operation 337, non-write burst write operations can be performed using the designated static SLC block to store data associated with the non-write burst write operations. As described herein, a memory sub-system can, in response to signaling received from a host or host system, access the designated static SLC block in a similar way as it would access a dynamic SLC block from the third portion and perform a non-write burst write operation on the designated static SLC block. In this way, data associated with be non-write burst write operation can be stored on the designated static SLC block.

At operation 338, the static SLC block can be identified as part of the fourth portion when the non-write burst write operation is performed. As described herein, the static SLC block can be identified as storing non-write burst data from a non-write burst write operation. In this way, the method 330 can designate the static SLC block as part of the fourth portion. In some embodiments, the quantity of dynamic SLC blocks and static SLC blocks within the fourth portion can be monitored to ensure that static SLC blocks are redesignated to the first portion such that the write burst operations that are required to use the static SLC blocks have access to free static SLC blocks. In some examples, the count within the fourth portion can be monitored or registered to determine if additional dynamic SLC blocks are to be designated to the third portion as free dynamic SLC blocks for non-write burst operations.

At operation 339, the static SLC block can be designated as part of the first portion in response to a performance of a media management operation that involves removing the data associated with the non-write burst write operations. As described herein, the static SLC block can be designated to the first portion when the data associated with the non-write burst write operation is removed or erased from the static SLC block. Normally blocks from the fourth portion would be designated to the third portion to allow non-write burst write operations to be performed on the erased blocks, but the static SLC block may be needed by write burst write operations within the first portion. In some examples, dynamic SLC blocks from the first portion can be designated to the third portion when the static SLC block is designated back to the first portion. In this way, a greater quantity of static SLC blocks can remain within the first portion, where they may be needed for write burst operations.

In some embodiments, the method 330 can include operations to determine when the first portion does not include dynamic SLC blocks and prevent designating the static SLC block from the first portion to the third portion to be used as free non-write burst blocks. In some examples, the first portion may need to include the static SLC blocks when there are no additional dynamic SLC blocks within the first portion. In this way, the quantity of dynamic SLC blocks and static SLC blocks designated to the first portion can be monitored to ensure that static SLC blocks are not designated to the third portion when the first portion does not include additional dynamic SLC blocks. For example, in some embodiments, the method 330 can include operations to record a count of a situation when determining that there are no available dynamic SLC blocks in the first portion and releasing a dynamic SLC block from the second portion to the third portion. In this way, a dynamic SLC block from the second portion that has data that has been erased can be designated to the third portion instead of being redesignated back to the first portion. This can allow the third portion to continue to provide free memory cells for non-write burst write operations without affecting performance or opening an additional block for free non-write burst blocks.

In some embodiments, the method 330 can include operations to lower a data count in response to releasing the dynamic SLC block from the second portion. In some examples, lowering the data count can include performing a memory management operation to erase data stored in particular SLC blocks. For example, data stored in dynamic SLC blocks from the second portion can be erased to allow the dynamic SLC block from the second portion to designated to the first portion or the third portion based on a count associated with the first portion and/or a count associated with the third portion. In this way, the SLC blocks can be dynamically designated or allocated to provide increased performance and decrease a quantity of memory cells that are designated within the over provisioning portion of the memory array.

Figure 4:
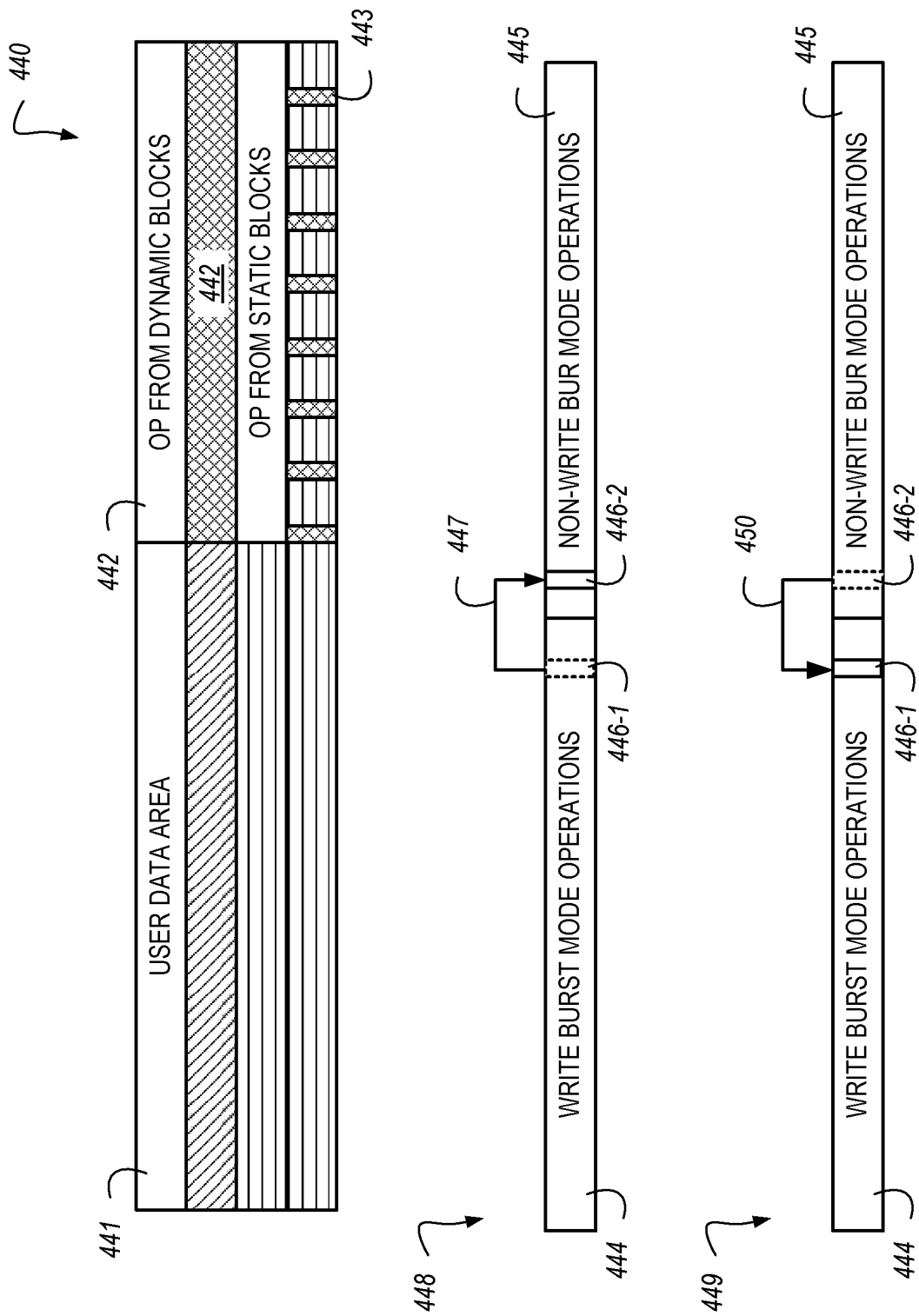
FIG. 4 illustrates an example of memory management involving over provisioned memory blocks for a set of memory cells in accordance with some embodiments of the present disclosure.

FIG. 4 illustrates an example of over provisioning memory management for a set of memory cells 440 in accordance with some embodiments of the present disclosure. FIG. 4 illustrates a set of memory cells 440 that can be split into a user data area portion 441 and an over provisioning portion that includes a dynamic over provisioning portion 442 and static over provisioning portion 443.

As described herein, the over provisioning portion can be split into a write burst operations portion 444 and a non-write burst operations portion 445. That is, write burst write operations can be performed using memory cells within the write burst operations portion 444 and non-write burst write operations can be performed using memory cells within the non-write burst operations portion 445. For example, a memory sub-system can, responsive to signaling received from a host, perform a write burst write operation on the memory cells within the write burst operations portion 444 and the host can perform non-write burst write operations on the memory cells within the non-write burst operations portion 445.

FIG. 4 illustrates a first operation 448. In some embodiments the first operation 448 can be performed by an over provisioning memory management component 113 as described herein. In some embodiments, the first operation 448 can include designating a static SLC block 446-1 from the write burst operations portion 444 to the non-write burst operations portion 445 as static SLC block 446-2 illustrated by a first arrow 447. In this way, the static SLC block 446-1 that was previously designated as part of the write burst operations portion 444 is now designated as SLC block 446-2 as part of the non-write burst operations portion 445. In this way, the SLC block 446-2 can be utilized to store data associated non-write burst write operations. The SLC block 446-2 can be designated as non-write burst data when non-write burst write operations write data to the SLC block 446-2.

FIG. 4 illustrates a second operation 449. In some embodiments, the second operation 449 can be performed by an over provisioning memory management component 113. In some embodiments, the second operation 449 can include designating the static SLC block 446-2 from the non-write burst operations portion 445 to the write burst operations portion 444 as illustrated by the second arrow 450. In the second operation 449, non-write burst data stored at the static SLC block 446-2 can be erased or removed through a memory management operation (e.g., garbage collection, folding, etc.). When the static SLC block 446-2 is to be designated from a data block to a free block, the static SLC block 446-2 can be designated to the write burst operations portion 444 from the non-write burst operations portion 445 as illustrated by the second arrow 450.

Figure 5:
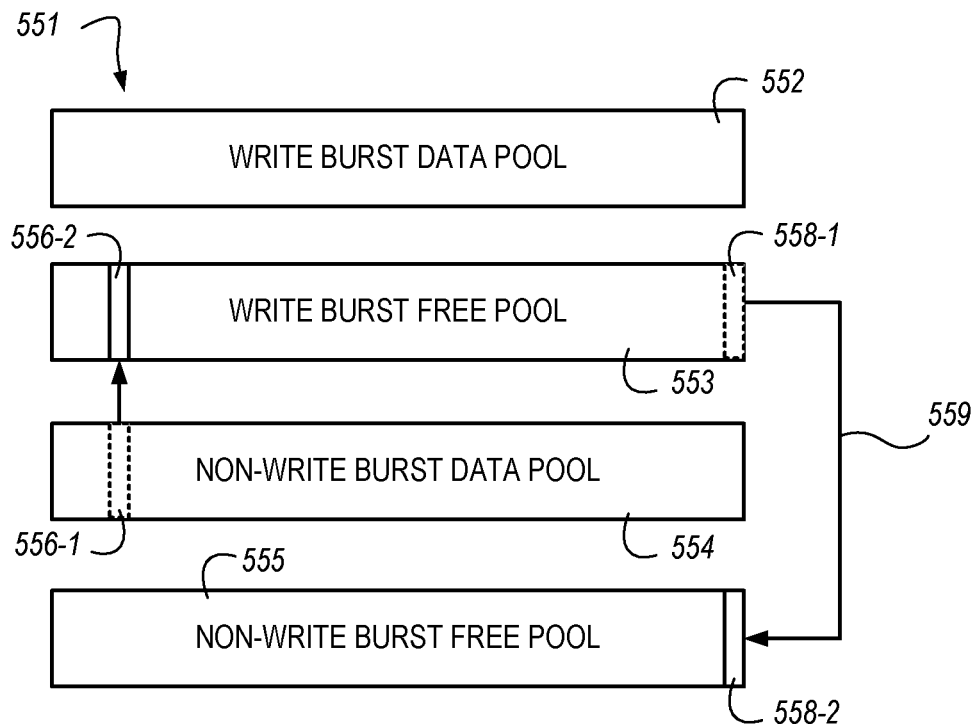
FIG. 5 illustrates an example of memory management involving over provisioned memory blocks for a set of memory cells in accordance with some embodiments of the present disclosure.

FIG. 5 illustrates an example of over provisioning memory management for a set of memory cells 551 in accordance with some embodiments of the present disclosure. In some embodiments the set of memory cells 551 can be memory cells that are designated for over provisioning. FIG. 5 illustrates an over provisioning operation as described herein. In some embodiments, the over provisioning operation can include splitting or designating the set of memory cells 551 into a plurality of portions. For example, the memory cells 551 can be split into a write burst data pool 552, a write burst free pool 553, a non-write burst data pool 554, and/or a non-write burst free pool 555.

As described herein, the write burst data pool 552 can include memory cells that include occupied memory cells or memory cells that include stored data associated with write burst operations. In addition, the write burst free pool 553 can include memory cells that are unoccupied or do not include data. The write burst free pool 553 can include memory cells that are designated to be utilized to store data associated with write burst operations. In addition, the non-write burst data pool 554 can include memory cells that include occupied or stored data associated with non-write burst operations. Furthermore, the non-write burst free pool 555 can include memory cells that are unoccupied or do not include data. The non-write burst free pool 555 can be designated to be utilized for storing data associated with non-write burst operations.

FIG. 5 illustrates an over provisioning operation that includes designating a static SLC 556-1 from the non-write burst data pool 554 to the write burst free pool 553 as illustrated by arrow 557 to be designated as a static SLC 556-2. In this operation, data stored by the static SLC 556-1 within the non-write burst data pool 554 can be erased by a memory management operation such as a garbage collection operation. When the data from the static SLC 556-1 is erased, a processor can designate the SLC 556-1 as SLC 556-2 within the write burst free pool 553.

As described herein, designating the static SLC 556-2 to write burst free pool 553 can result in designating a dynamic SCL 558-1 from the write burst free pool 553 to the non-write burst data pool 554 to be designated as SLC 558-2 as illustrated by arrow 559. In this way, memory cells that are designated from the non-write burst data pool 554 result in additional memory cells designated to non-write burst free pool 555.

Figure 6:
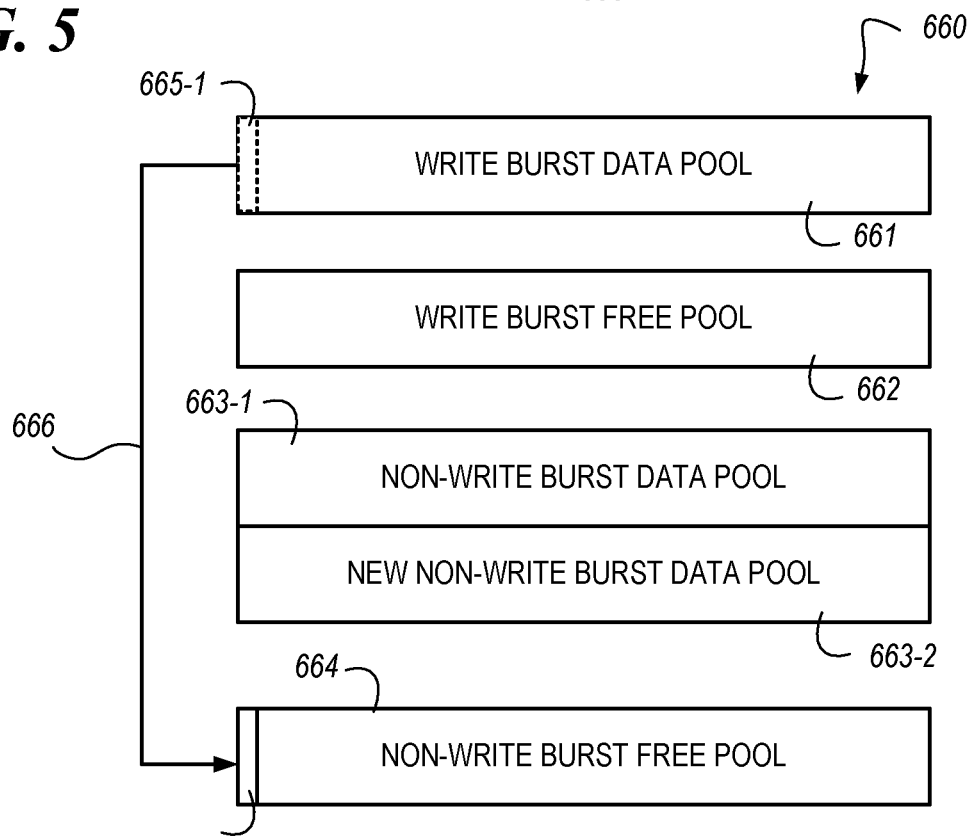
FIG. 6 illustrates an example of memory management involving over provisioned memory blocks for a set of memory cells in accordance with some embodiments of the present disclosure.

FIG. 6 illustrates an example of over provisioning memory management for a set of memory cells 660 in accordance with some embodiments of the present disclosure. FIG. 6 illustrates an example of over provisioning memory management for a set of memory cells 660 in accordance with some embodiments of the present disclosure. In some embodiments the set of memory cells 660 can be memory cells that are designated for over provisioning. FIG. 6 illustrates an over provisioning operation as described herein. In some embodiments, the over provisioning operation can include splitting or designating the set of memory cells 660 into a plurality of portions. For example, the memory cells 660 can be split into a write burst data pool 661, a write burst free pool 662, a non-write burst data pool 663-1, and/or a non-write burst free pool 664.

As described herein, the write burst data pool 661 can include memory cells that include occupied memory cells or memory cells that include stored data associated with write burst operations. In addition, the write burst free pool 662 can include memory cells that are unoccupied or do not include data. The write burst free pool 662 can include memory cells that are designated to be utilized to store data associated with write burst operations. In addition, the non-write burst data pool 663-1 can include memory cells that include occupied or stored data associated with non-write burst operations. Furthermore, the non-write burst free pool 664 can include memory cells that are unoccupied or do not include data. The non-write burst free pool 664 can be designated to be utilized for storing data associated with non-write burst operations.

FIG. 6 illustrates an over provisioning operation that includes determining that the non-write burst data pool 663-1 has fallen below a threshold of free non-write burst memory cells. As described herein, a new non-write burst data pool 663-2 can be opened to accommodate for the additional non-write burst requests from a host or host system. In some examples, the over provisioning operation can also include or alternatively include designating a dynamic SLC from the write burst data pool 661 to the non-write burst free pool 664 when the data from the dynamic SLC is erased or removed by a memory management operation. For example, the data from the dynamic SLC 665-1 can be erased or removed. In this example, the dynamic SLC 665-1 can be designated as 665-1 within the non-write burst free pool 664 instead of designating it back to the write burst free pool 662. In this way additional dynamic SLCs can be provided to the non-write burst free pool 664 when the non-write burst data pool 663-1 is exceeded by non-write burst data operations.

Figure 7:
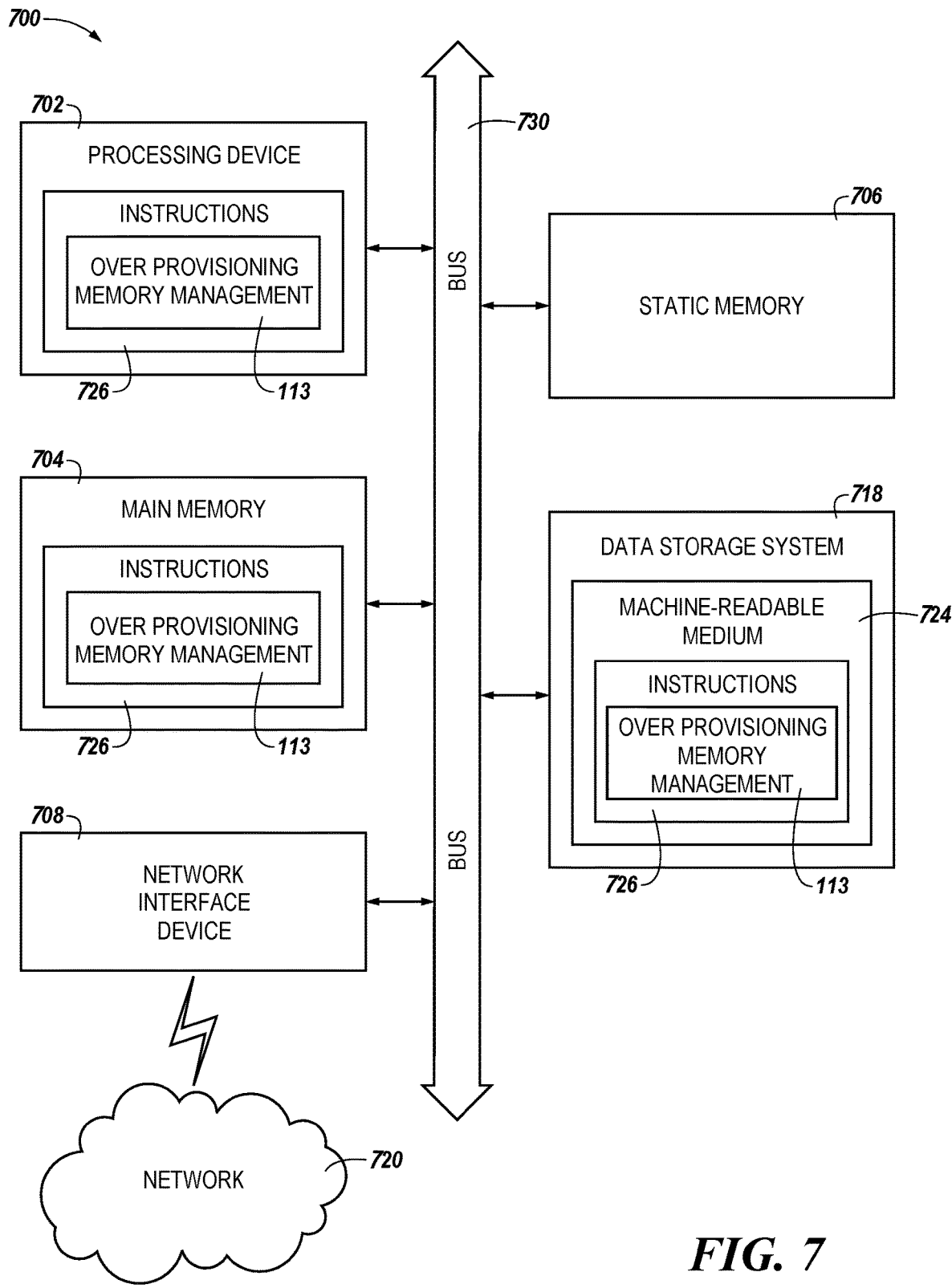
FIG. 7 is a block diagram of an example computer system in which embodiments of the present disclosure may operate.

FIG. 7 is a block diagram of an example computer system 700 in which embodiments of the present disclosure may operate. For example, FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the over provisioning memory management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to an over provisioning memory management component (e.g., the over provisioning memory management component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
designating, by an over provisioning component, a first set of memory cells of a memory array for use in write burst mode operations;
designating a second set of memory cells of the memory array for use in non-write burst mode operations;
identifying that a request to perform a particular non-write burst operation exceeds a quantity of memory cells available to the second set of memory cells for use in the non-write burst mode writing operations;
designating, by the over provisioning component, a portion of the first set of memory cells as a static single level cell (SLC) block for use in the non-write burst mode writing operations in response to the request;
writing data associated with the particular non-write burst writing operation to the static SLC block;
designating a dynamic SLC block from the first set of memory cells to the second set of memory cells when the static SLC block is designated to the first set of memory cells;

recording a count when no dynamic SLC blocks are available from the first set of memory cells; and
preventing a write burst buffer size from being increased in response to recording the count.

2. The method of claim 1, further comprising:
performing a media management operation involving data written to the memory array; and
designating the static SLC block back to the first set of memory cells for the write burst mode operation when the data associated with the particular non-write burst writing operation is erased during performance of the media management operation.

3. The method of claim 1, further comprising reducing the count when no dynamic SLC blocks are available from the first set of memory cells.

4. The method of claim 1, further comprising:
releasing a dynamic SLC block from a write burst data block pool to the second set of memory cells; and
reducing the count in response to releasing the dynamic SLC block from the write burst data block pool.

5. The method of claim 1, wherein the first set of memory cells include free memory cells for writing data associated with the write burst mode operations and the second set of memory cells include free memory cells for writing data associated with the non-write burst mode operations.

6. An apparatus, comprising:
a memory array; and
an over provisioning component coupled to the memory array and configured to:
designate a set of memory cells of the memory array for over provisioning;
designate a first portion of the set of memory cells as free write burst blocks, wherein the first portion includes dynamic single level cell (SLC) blocks and static SLC blocks;
designate a second portion of the set of memory cells as free non-write burst blocks, wherein the second portion includes dynamic SLC blocks;
designate a static SLC block from the first portion to the second portion to be used as free non-write burst blocks;
perform non-write burst operations using the designated static SLC block;
open a third portion of the memory array as free non-write burst blocks when the static SLC block is exceeded from the non-write burst write operations; and
designate free dynamic SLC blocks from a write burst data pool to the second portion in response to performance of a write burst flush operation.

7. The apparatus of claim 6, wherein the second portion includes only dynamic SLC blocks prior to designating the static SLC block from the first portion to the second portion.

8. The apparatus of claim 6, wherein the over provisioning component is configured to designate the static SLC block back to the first portion from the second portion after a media management operation is performed on the memory array.

9. The apparatus of claim 8, wherein the over provisioning component is configured to designate a dynamic SLC block from the first portion to the second portion in response to designating the static SLC block back to the first portion.

10. The apparatus of claim 6, wherein the apparatus is a smart phone and the memory array comprises a quantity of quad level cells (QLCs) configured to use SLCs or triple level cells (TLCs) within the memory array to support asynchronous power loss (APL).

11. The apparatus of claim 6, wherein the over provisioning component is configured to:
determine when the first portion includes no dynamic SLC block; and
prevent the static SLC block designated to the free non-write burst block from being designated a garbage collection source block.

12. A system, comprising:
a plurality of memory components arranged to form a stackable cross-gridded array of interleaved NAND memory cells; and
a processing device coupled to the plurality of memory components, the processing device to perform operations comprising:
designating a set of memory cells of the NAND memory cells for over provisioning;
designating a first portion of the set of memory cells as free write burst blocks, wherein the first portion includes static single level cell (SLC) blocks;
identifying a second portion of the set of memory cells as data write burst blocks with data stored from write burst writing operations;
designating a third portion of the set of memory cells as free non-write burst blocks, wherein the third portion includes dynamic SLC blocks;
identifying a fourth portion of the set of memory cells as data non-write burst blocks with data stored from non-write burst writing operations;
designating a static SLC block from the first portion to the third portion to be used as free non-write burst blocks;
performing non-write burst write operations using the designated static SLC block to store data associated with the non-write burst write operations;
identifying the static SLC block as part of the fourth portion when the non-write burst write operation is performed;
designating the static SLC block as part of the first portion in response to a performance of a media management operation that involves removing the data associated with the non-write burst write operations; and
recording a count of a situation when determining that there are no available dynamic SLC blocks in the first portion.

13. The system of claim 12, wherein the media management operation is a foreground garbage collection operation.

14. The system of claim 13, wherein the processing device to perform operations comprising:
determining when the first portion does not include dynamic SLC blocks; and
preventing designating the static SLC block from the first portion to the third portion to be used as free non-write burst blocks.

15. The system of claim 12, wherein the processing device is to perform operations comprising releasing a dynamic SLC block from the second portion to the third portion.

16. The system of claim 15, wherein the processing device is to perform operations comprising lowering a data count in response to releasing the dynamic SLC block from the second portion.

17. The system of claim 12, wherein at least a portion of the NAND memory cells comprise quad level cells resident on a cell phone or wearable device.

18. An apparatus, comprising:
a memory array; and an over provisioning component coupled to the memory array and configured to:
 designate a set of memory cells of the memory array for over provisioning;
 designate a first portion of the set of memory cells as free write burst blocks, wherein the first portion includes dynamic single level cell (SLC) blocks and static SLC blocks;
 designate a second portion of the set of memory cells as free non-write burst blocks, wherein the second portion includes dynamic SLC blocks;
 designate a static SLC block from the first portion to the second portion to be used as free non-write burst blocks;
 perform non-write burst operations using the designated static SLC block;
 open a third portion of the memory array as free non-write burst blocks when the static SLC block is exceeded from the non-write burst write operations;
 designate the static SLC block back to the first portion from the second portion after a media management operation is performed on the memory array; and
 designate a dynamic SLC block from the first portion to the second portion in response to designating the static SLC block back to the first portion.

19. A system, comprising:
 a plurality of memory components arranged to form a stackable cross-gridded array of interleaved NAND memory cells; and
 a processing device coupled to the plurality of memory components, the processing device to perform operations comprising:
  designating a set of memory cells of the NAND memory cells for over provisioning;
  designating a first portion of the set of memory cells as free write burst blocks, wherein the first portion includes static single level cell (SLC) blocks;
  identifying a second portion of the set of memory cells as data write burst blocks with data stored from write burst writing operations;
  designating a third portion of the set of memory cells as free non-write burst blocks, wherein the third portion includes dynamic SLC blocks;
  identifying a fourth portion of the set of memory cells as data non-write burst blocks with data stored from non-write burst writing operations;
  designating a static SLC block from the first portion to the third portion to be used as free non-write burst blocks;
  performing non-write burst write operations using the designated static SLC block to store data associated with the non-write burst write operations;
  identifying the static SLC block as part of the fourth portion when the non-write burst write operation is performed;
  designating the static SLC block as part of the first portion in response to a performance of a media management operation that involves removing the data associated with the non-write burst write operations, wherein the media management operation is a foreground garbage collection operation;
  determining when the first portion does not include dynamic SLC blocks; and
  preventing designating the static SLC block from the first portion to the third portion to be used as free non-write burst blocks.

* * * * *